(12) United States Patent
Noh et al.

(10) Patent No.: US 12,212,176 B2
(45) Date of Patent: Jan. 28, 2025

(54) BATTERY MANAGEMENT SYSTEM, BATTERY PACK, ELECTRIC VEHICLE AND BATTERY MANAGEMENT METHOD

(71) Applicant: LG Energy Solution, Ltd., Seoul (KR)

(72) Inventors: Seung-Jin Noh, Daejeon (KR); Seog-Jin Yoon, Daejeon (KR); Won-Hoe Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 499 days.

(21) Appl. No.: 17/629,102

(22) PCT Filed: Nov. 19, 2020

(86) PCT No.: PCT/KR2020/016405
§ 371 (c)(1),
(2) Date: Jan. 21, 2022

(87) PCT Pub. No.: WO2021/112459
PCT Pub. Date: Jun. 10, 2021

(65) Prior Publication Data
US 2022/0294249 A1    Sep. 15, 2022

(30) Foreign Application Priority Data

Dec. 4, 2019    (KR) .................. 10-2019-0160105

(51) Int. Cl.
*H02J 7/00* (2006.01)
*B60L 58/10* (2019.01)
(Continued)

(52) U.S. Cl.
CPC .......... *H02J 7/00712* (2020.01); *B60L 58/10* (2019.02); *H01M 10/425* (2013.01);
(Continued)

(58) Field of Classification Search
CPC ... H02J 7/00712; H02J 7/00309; B60L 58/10; H01M 10/425; H01M 10/482;
(Continued)

(56) References Cited

U.S. PATENT DOCUMENTS

| 4,803,416 A | 2/1989 | Abiven et al. |
| 6,359,794 B1 * | 3/2002 | Real .......... H02J 9/062 |
| | | 307/66 |

(Continued)

FOREIGN PATENT DOCUMENTS

| CN | 205523742 U | 8/2016 |
| CN | 207156946 U | 3/2018 |

(Continued)

OTHER PUBLICATIONS

International Search Report issued in corresponding International Patent Application No. PCT/KR2020/016405 dated Feb. 25, 2021.

(Continued)

*Primary Examiner* — Suresh Memula
(74) *Attorney, Agent, or Firm* — Morgan, Lewis & Bockius LLP

(57) ABSTRACT

A battery management system according to the present disclosure is for a battery connected in parallel to a smoothing capacitor through a high side power line and a low side power line. The battery management system includes a discharge control switch connected between a first node and a second node of the low side power line, a temperature sensing circuit including a thermistor, wherein a first terminal of the thermistor is connected to the first node, a precharge switch connected to a precharge power line between a second terminal of the thermistor to the second node, and a control unit. The control unit is configured to turn off the discharge control switch and turn on the pre-
(Continued)

charge switch, for precharging of the smoothing capacitor, when the control unit receives a key-on signal.

20 Claims, 4 Drawing Sheets

(51) Int. Cl.
*H01M 10/42* (2006.01)
*H01M 10/48* (2006.01)
*H01M 16/00* (2006.01)

(52) U.S. Cl.
CPC ....... *H01M 10/482* (2013.01); *H01M 10/486* (2013.01); *H01M 16/00* (2013.01); *H02J 7/00309* (2020.01); *H01M 2010/4271* (2013.01); *H01M 2220/20* (2013.01)

(58) Field of Classification Search
CPC ............... H01M 10/486; H01M 16/00; H01M 2010/4271; H01M 2220/20
USPC .......................................................... 320/134
See application file for complete search history.

(56) References Cited

U.S. PATENT DOCUMENTS

| | | | | |
|---|---|---|---|---|
| 6,493,243 | B1* | 12/2002 | Real | H02J 9/062 307/66 |
| 2008/0259514 | A1* | 10/2008 | Cagno | H02H 9/004 361/93.7 |
| 2009/0295224 | A1 | 12/2009 | Kobayashi et al. | |
| 2009/0295334 | A1 | 12/2009 | Yang et al. | |
| 2010/0085022 | A1* | 4/2010 | Shimizu | H02J 7/04 320/162 |
| 2011/0049977 | A1* | 3/2011 | Onnerud | B60L 58/24 307/9.1 |
| 2013/0043828 | A1* | 2/2013 | Gurlahosur | H02J 7/007184 320/107 |
| 2013/0043829 | A1* | 2/2013 | Gurlahosur | H02J 7/007182 320/107 |
| 2013/0069598 | A1* | 3/2013 | Tanaka | H01M 10/44 320/134 |
| 2014/0062387 | A1 | 3/2014 | Kim | |
| 2014/0125290 | A1 | 5/2014 | Kim et al. | |
| 2016/0261127 | A1* | 9/2016 | Worry | H02J 7/0029 |
| 2017/0299444 | A1 | 10/2017 | Green | |
| 2018/0364310 | A1* | 12/2018 | Taya | H02J 50/80 |
| 2019/0061653 | A1 | 2/2019 | Takahashi et al. | |
| 2020/0185954 | A1 | 6/2020 | Song et al. | |
| 2020/0274375 | A1* | 8/2020 | Griffiths | H02J 7/24 |
| 2020/0287462 | A1* | 9/2020 | Hata | B60L 1/00 |
| 2021/0252990 | A1* | 8/2021 | Wang | B60L 53/22 |
| 2023/0155482 | A1* | 5/2023 | Dent | H02J 7/35 307/77 |
| 2024/0047982 | A1* | 2/2024 | Green | B60R 16/033 |

FOREIGN PATENT DOCUMENTS

| | | | |
|---|---|---|---|
| CN | 109196317 | A | 1/2019 |
| CN | 209409777 | U | 9/2019 |
| EP | 2224257 | A2 * 9/2010 ............ B60L 3/0046 |
| EP | 2 822 132 | A1 | 1/2015 |
| JP | 2003-092826 | A | 3/2003 |
| JP | 2009-229405 | A | 10/2009 |
| JP | 2009-290920 | A | 12/2009 |
| JP | 2010-193558 | A | 9/2010 |
| JP | 2013-179760 | A | 9/2013 |
| JP | 2014-060881 | A | 4/2014 |
| JP | 2015-154585 | A | 8/2015 |
| JP | 2015-173569 | A | 10/2015 |
| JP | 2019-043271 | A | 3/2019 |
| KR | 20-2000-0002749 | U | 2/2000 |
| KR | 10-2003-0084485 | A | 11/2003 |
| KR | 10-2005-0066242 | A | 6/2005 |
| KR | 10-2006-0047468 | A | 5/2006 |
| KR | 10-2007-0096646 | A | 10/2007 |
| KR | 10-2009-0126097 | A | 12/2009 |
| KR | 10-2013-0092350 | A | 8/2013 |
| KR | 10-1314114 | B1 | 10/2013 |
| KR | 10-1975395 | B1 | 5/2019 |
| KR | 10-2019-0098532 | A | 8/2019 |

OTHER PUBLICATIONS

Office Action dated Feb. 20, 2023, issued in corresponding Japanese Patent Application No. 2022-500982.

Office Action issued Aug. 31, 2023 for counterpart Chinese Patent Application No. 202080048317.6 Citation: JP 2009-229405 A, US 2009/0295334 A1, US 2014/0062387 A1 & CN 209409777 U are of record.

\* cited by examiner

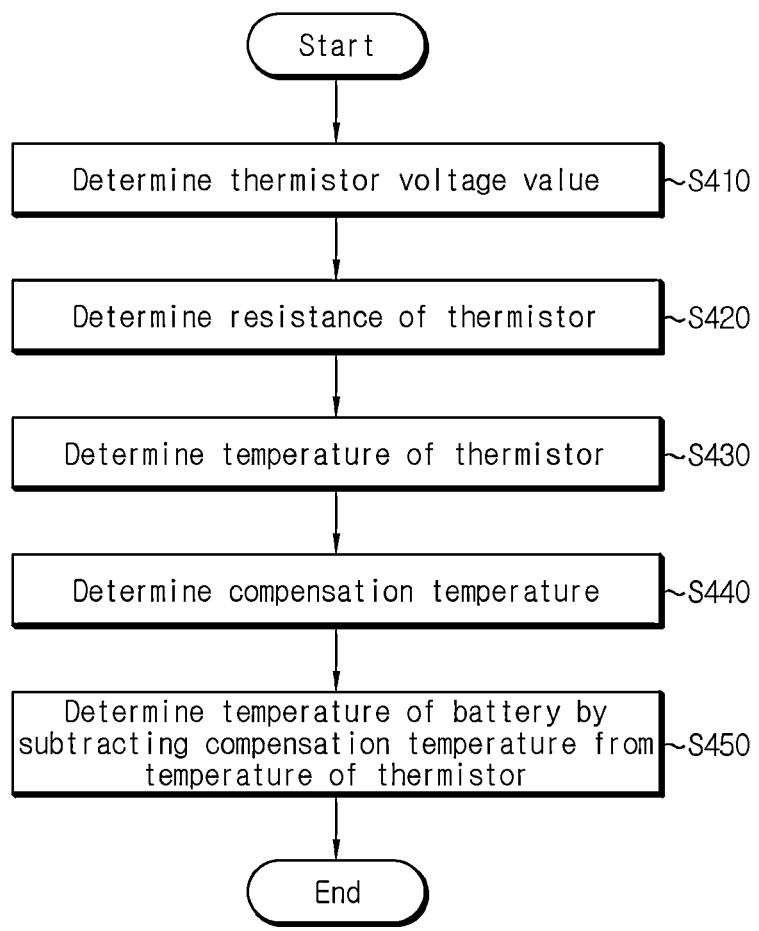

BATTERY MANAGEMENT SYSTEM, BATTERY PACK, ELECTRIC VEHICLE AND BATTERY MANAGEMENT METHOD

TECHNICAL FIELD

The present disclosure relates to technology for precharging a smoothing capacitor provided between an inverter and a battery of an electric vehicle.

The present application claims priority to Korean Patent Application No. 10-2019-0160105 filed in the Republic of Korea on Dec. 4, 2019, the disclosure of which is incorporated herein by reference.

BACKGROUND ART

Recently, there has been a dramatic increase in demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

In general, a smoothing capacitor is provided to reduce a sharp change in voltage between a battery and an inverter mounted in an electric vehicle.

However, since a precharge resistor of a precharge circuit according to the conventional art is only a necessary component for precharging, the precharge resistor cannot play any other role during most of the charging/discharging cycles of the battery. Further, since the precharge resistor occupies a considerable space in a battery management system, the space utility is low.

DISCLOSURE

Technical Problem

The present disclosure is designed to solve the above-described problem, and therefore the present disclosure is directed to providing a battery management system, a battery pack, an electric vehicle and a battery management method for precharging a smoothing capacitor using a thermistor of a temperature sensing circuit as a current limiter, instead of a precharge resistor.

These and other objects and advantages of the present disclosure may be understood by the following description and will be apparent from the embodiments of the present disclosure. In addition, it will be easily understood that the objects and advantages of the present disclosure may be realized by the means set forth in the appended claims and a combination thereof.

Technical Solution

A battery management system according to an aspect of the present disclosure is for a battery connected in parallel to a smoothing capacitor through a high side power line and a low side power line. The battery management system includes a discharge control switch installed between a first node and a second node of the low side power line, a temperature sensing circuit including a thermistor, wherein a first terminal of the thermistor is connected to the first node, a precharge switch installed on a precharge power line connecting a second terminal of the thermistor to the second node, and a control unit coupled to the discharge control switch, the temperature sensing circuit and the precharge switch. The control unit is configured to turn off the discharge control switch and turn on the precharge switch, for precharging of the smoothing capacitor, when the control unit receives a key-on signal.

The control unit may be configured to turn off the precharge switch when a voltage across the smoothing capacitor rises equal to or above a threshold voltage.

The control unit may be configured to determine an initial thermistor voltage value in response to the key-on signal. The initial thermistor voltage value indicates a voltage across the thermistor when a precharge current does not flow through the precharge power line. The control unit may be configured to turn off the discharge control switch and turn on the precharge switch, for precharging of the smoothing capacitor, when the initial thermistor voltage value is equal to or higher than a predetermined set voltage value.

The thermistor may be a Negative Temperature Coefficient thermistor.

The battery management system may further include a shunt resistor installed on the low side power line. The control unit may be configured to determine a precharge current value indicating a precharge current flowing through the precharge power line based on a shunt voltage value indicating a voltage across the shunt resistor at a predetermined time interval during the precharging of the smoothing capacitor.

The control unit may be configured to determine a resistance of the thermistor based on a thermistor voltage value indicating a voltage across the thermistor and the precharge current value at the predetermined time interval during the precharging of the smoothing capacitor. The control unit may be configured to determine a temperature of the thermistor based on the resistance of the thermistor.

The control unit may be configured to determine a temperature of the battery by subtracting a compensation temperature corresponding to Joule heat of the thermistor by the precharge current from the temperature of the thermistor at the predetermined time interval during the precharging of the smoothing capacitor.

The compensation temperature may indicate an increase in the temperature of the thermistor caused by the precharge current.

The control unit may be configured to determine the compensation temperature using the following Equation:

$$\Delta T_{pre}[k] = \Delta T_{pre}[k-1] + \frac{\Delta Q_{pre}[k]}{TC_{ntc}} \quad \langle \text{Equation} \rangle$$

wherein k is a cycle index that increases by 1 each time the predetermined time interval has passed since the precharging started, $\Delta T_{pre}[k-1]$ is the compensation temperature when the cycle index is k−1, $\Delta Q_{pre}[k]$ is the Joule heat of the thermistor generated for the predetermined time by the precharge current when the cycle index is k, $TC_{ntc}$ is heat capacity of the thermistor, and $\Delta T_{pre}[k]$ is the compensation temperature when the cycle index is k.

The battery management system may further include a diode connected to the precharge power line. A current from the second terminal of the thermistor to the second node may be blocked by the diode.

The battery management system may further include a charge control switch installed on the high side power line or the low side power line.

A battery pack according to another aspect of the present disclosure includes the battery management system.

An electric vehicle according to still another aspect of the present disclosure includes the battery pack.

A battery management method according to yet another aspect of the present disclosure is executed by the battery management system.

Advantageous Effects

According to at least one of the embodiments of the present disclosure, it is possible to precharge the smoothing capacitor using the thermistor of the temperature sensing circuit provided to detect the temperature of the battery as a current limiter. Accordingly, there is no need to add a precharge resistor in the battery management system like the conventional art, thereby increasing the space utility.

In addition, according to at least one of the embodiments of the present disclosure, it is possible to determine the temperature of the battery by subtracting an increase in temperature of the thermistor caused by the precharge current from the temperature of the thermistor during precharging.

The effects of the present disclosure are not limited to the above-mentioned effects, and these and other effects will be clearly understood by those skilled in the art from the appended claims.

BRIEF DESCRIPTION OF THE DRAWINGS

The accompanying drawings illustrate a preferred embodiment of the present disclosure, and together with the following detailed description of the present disclosure, serve to provide a further understanding of the technical aspects of the present disclosure, and thus the present disclosure should not be construed as being limited to the drawings.

FIG. 4 is a flowchart exemplarily showing a battery management method according to a second embodiment of the present disclosure.

DETAILED DESCRIPTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

The terms including the ordinal number such as "first", "second" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements. Additionally, the term "control unit" as used herein refers to a processing unit of at least one function or operation, and may be implemented by hardware or software alone or in combination.

In addition, throughout the specification, it will be further understood that when an element is referred to as being "connected to" another element, it can be directly connected to the other element or intervening elements may be present.

Figure 1:
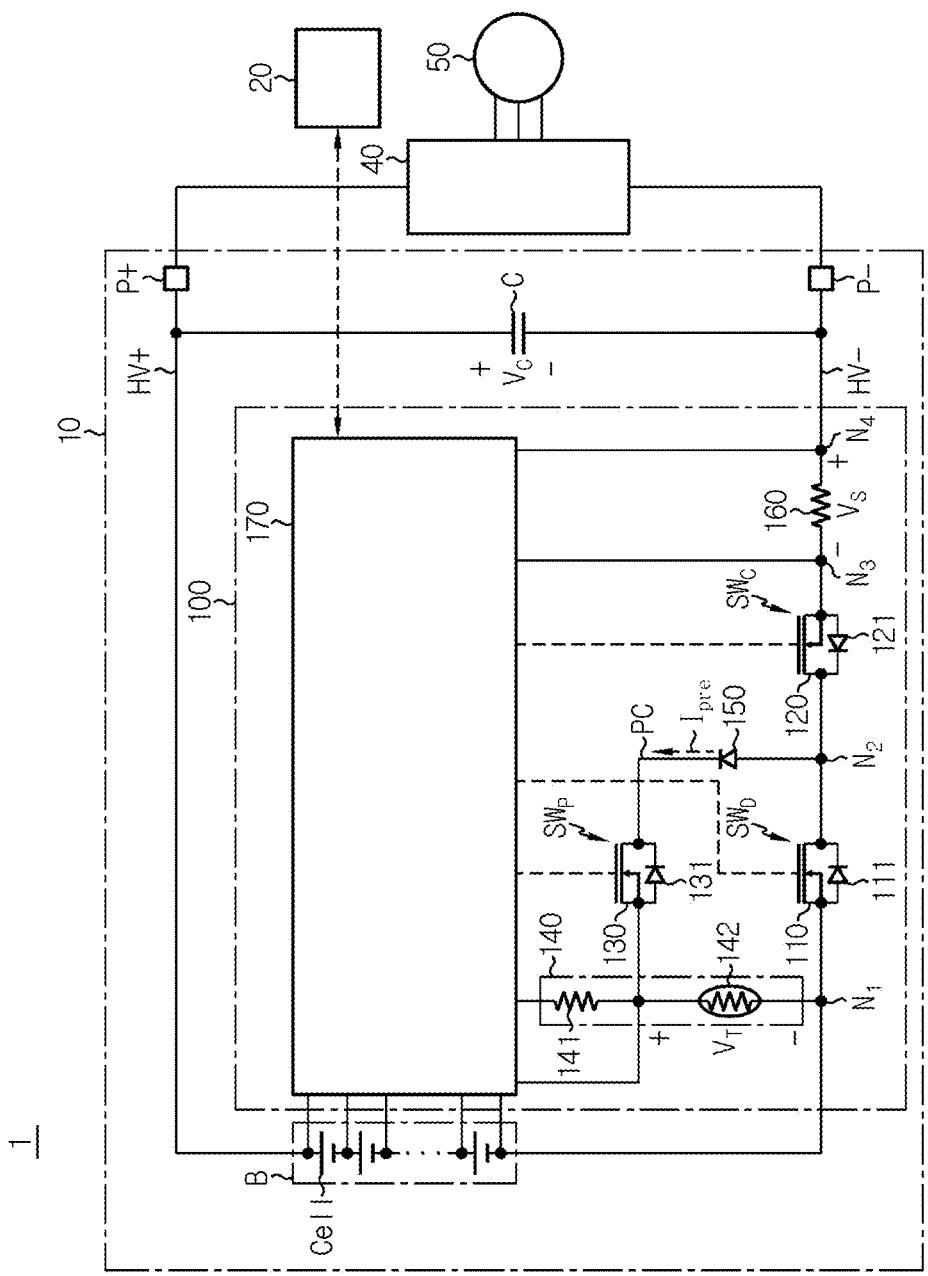
FIG. 1 is a diagram exemplarily showing a configuration of an electric vehicle according to the present disclosure.

FIG. 1 is a diagram exemplarily showing a configuration of an electric vehicle 1 according the present disclosure.

Referring to FIG. 1, the electric vehicle 1 includes a battery pack 10, a vehicle controller 20, an inverter 40 and an electric motor 50.

The vehicle controller 20 is configured to generate a key-on signal in response to a startup switch (not shown) provided in the electric vehicle 1 being switched to an ON-position by a user. The vehicle controller 20 is configured to generate a key-off signal in response to the startup switch being switched to an OFF-position by the user.

The battery pack 10 includes a battery B, a smoothing capacitor C, a high side power line HV+, a low side power line HV− and a battery management system 100.

The battery B includes a plurality of battery cells Cell electrically connected either in series or in parallel, or both. The battery cell Cell includes any type of repeatedly rechargeable battery, for example, a lithium ion cell, and is not limited to a particular type.

A positive electrode terminal of the battery B is electrically connected to a first pack terminal P+ of the battery pack 10 through the high side power line HV+. A negative electrode terminal of the battery B is electrically connected to a second pack terminal P− of the battery pack 10 through the low side power line HV−.

The inverter 40 converts the direct current power supplied from the battery B to alternating current power and supplies the same to the electric motor 50.

The smoothing capacitor C is provided to smooth the direct current power supplied to the inverter 40. The smoothing capacitor C is electrically connected in parallel to the inverter 40 between the first pack terminal P+ and the second pack terminal P− of the battery pack 10. That is, a first terminal of the smoothing capacitor C is electrically connected to the first pack terminal P+, and a second terminal of the smoothing capacitor C is electrically connected to the second pack terminal P−. Accordingly, the battery B is electrically connected in parallel to the smoothing capacitor C through the high side power line HV+ and the low side power line HV−.

The battery management system 100 includes a discharge control switch $SW_D$, a temperature sensing circuit 140, a precharge switch $SW_P$ and a control unit 170. The battery management system 100 may further include at least one of a charge control switch $SW_C$, a precharge diode 150 and a shunt resistor 160.

The discharge control switch $SW_D$ is provided to control a discharge current of the battery B. The discharge control switch $SW_D$ may be installed on the low side power line HV−. In detail, the discharge control switch $SW_D$ is electrically connected in series between a node $N_1$ and a node $N_2$. Each of the node $N_1$ and the node $N_2$ may be a part of the low side power line HV−. The length of a current path between the node $N_1$ and the first pack terminal P+ may be shorter than the length of a current path between the node $N_2$ and the first pack terminal P+.

The discharge control switch $SW_D$ may include a discharge Field Effect Transistor (FET) 110 and a parasitic diode 111. The discharge FET 110 has a drain, a source and a gate. The source of the discharge FET 110 may be electrically connected to the node $N_1$. The drain of the discharge FET 110 may be electrically connected to the node $N_2$. The gate of the discharge FET 110 may be electrically connected to the control unit 170. The parasitic diode 111 is electrically connected in parallel to the discharge FET 110. The parasitic diode 111 is connected between the drain and the source of the discharge FET 110 in a direction of shutting off the discharge current. Accordingly, the discharging of the battery B is interrupted by the parasitic diode 111 while the discharge FET 110 is turned off, and the battery B can be discharged only while the discharge FET 110 is turned on.

The temperature sensing circuit 140 includes a series circuit of a protection resistor 141 and a thermistor 142. The thermistor 142 may be a Negative Temperature Coefficient (NTC) thermistor.

A first terminal of the thermistor 142 is electrically connected to the node $N_1$. A first terminal of the protection resistor 141 is electrically connected to a second terminal of the thermistor 142. A second terminal of the protection resistor 141 is electrically connected to a reference voltage terminal of the control unit 170. The control unit 170 may generate a reference voltage having a predetermined voltage level from a voltage of the battery B or an additional voltage source (for example, a lead-acid battery of the electric vehicle 1) using a voltage conversion circuit (for example, a DC-DC converter) embedded in the control unit 170. The reference voltage outputted from the reference voltage terminal is divided by the protection resistor 141 and the thermistor 142. For example, when the reference voltage=5V and a resistance ratio between the protection resistor 141 and the thermistor 142 is 19:1, a voltage $V_T$ across the thermistor 142 (hereinafter referred to as a 'thermistor voltage') is 5V×1/(19+1)=0.25V. The control unit 170 is configured to detect the temperature of the battery B based on the thermistor voltage $V_T$.

The precharge switch $SW_P$ is installed on a precharge power line PC connecting the second terminal of the thermistor 142 to the node $N_2$. That is, the precharge switch $SW_P$ may be electrically connected in parallel to the series circuit of the thermistor 142 and the discharge control switch $SW_D$.

The precharge switch $SW_P$ may include a precharge FET 130 and a parasitic diode 131. The precharge FET 130 has a drain, a source and a gate. The source of the precharge FET 130 may be electrically connected to the second terminal of the thermistor 142. The drain of the precharge FET 130 may be electrically connected to the node $N_2$. The gate of the precharge FET 130 may be electrically connected to the control unit 170. The parasitic diode 131 is electrically connected in parallel to the precharge FET 130. The parasitic diode 131 is connected between the drain and the source of the precharge FET 130 in a direction of shutting off a precharge current. Accordingly, the precharging of the smoothing capacitor C is interrupted by the parasitic diode 131 while the precharge FET 130 is turned off, and the smoothing capacitor C can be precharged only while the precharge FET 130 is turned on.

It is noted that the precharge switch $SW_P$ is electrically connected to the thermistor 142 of the temperature sensing circuit 140 instead an additional precharge resistor, and is capable of selectively opening/closing the flow of current through the precharge power line PC as the current path for precharging of the smoothing capacitor C. Additionally, when the thermistor 142 is the NTC thermistor, the resistance of the thermistor 142 gradually reduces during precharging, and thus the precharging operation may be effectively performed compared to the conventional art using a precharge resistor.

The precharge diode 150 may be installed on the precharge power line PC in the contrary direction to the parasitic diode 131 (i.e., a direction allowing the precharge current). In detail, the precharge diode 150 may be electrically connected between the drain of the precharge switch $SW_P$ and the node $N_2$, or between the second terminal of the thermistor 142 and the source of the precharge switch $SW_P$.

The charge control switch $SW_C$ is provided to control a charge current of the battery B. In detail, referring to FIG. 1, the charge control switch $SW_C$ may be installed on the low side power line HV−. The charge control switch $SW_C$ may be electrically connected in series between the node $N_2$ and a node $N_3$. The node $N_3$ may be a part of the low side power line HV−. The length of a current path between the node $N_3$ and the second pack terminal P− may be shorter than the length of a current path between the node $N_2$ and the second pack terminal P−.

The charge control switch $SW_C$ may include a charge FET 120 and a parasitic diode 121. The charge FET 120 has a drain, a source and a gate. The drain of the charge FET 120 may be electrically connected to the node $N_2$. The source of the charge FET 120 may be electrically connected to the node $N_2$. The gate of the charge FET 120 may be electrically connected to the control unit 170. The parasitic diode 121 is electrically connected in parallel to the charge FET 120. The parasitic diode 121 is connected between the drain and the source of the charge FET 120 in a direction of shutting off the charge current. Accordingly, the charging of the battery B is interrupted by the parasitic diode 121 while the charge FET 120 is turned off, and the battery B can be charged only while the charge FET 120 is turned on.

Alternatively, the charge control switch $SW_C$ may be installed on the high side power line HV+ instead of the low side power line HV−. In this case, the drain of the charge FET 120 may be electrically connected to the first pack terminal P+, and the source of the charge FET 120 may be electrically connected to the positive electrode terminal of the battery B.

The shunt resistor 160 may be installed on the high side power line HV+ or the low side power line HV−. For example, as shown in FIG. 1, the shunt resistor 160 may be electrically connected between the node $N_3$ and a node $N_4$. The node $N_4$ may be a part of the low side power line HV−. The length of a current path between the node $N_4$ and the second pack terminal P− may be shorter than the length of a current path between the node $N_3$ and the second pack terminal P−. The shunt resistor 160 may be installed on the high side power line HV+, instead of the low side power line HV−.

The shunt resistor 160 has a predetermined resistance (hereinafter referred to as a 'shunt resistance'). A value of the shunt resistance may be pre-recorded in the control unit 170. The control unit 170 may determine a voltage value (hereinafter referred to as a 'shunt voltage value') indicating a voltage Vs across the shunt resistor 160. The control unit 170 may determine a current value of the precharge current (hereinafter referred to as a 'precharge current value') based on the shunt voltage value and the shunt resistance, according to the Ohm's law, during the precharging of the smoothing capacitor C. The precharge current refers to an electric current flowing through the battery B and the precharge power line PC.

The control unit 170 may be referred to as a 'control circuit', and may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors or electrical units for performing other functions.

The control unit 170 may include a memory embedded therein. The memory may store programs and data necessary to perform methods as described below. The memory may include, for example, at least one type of storage medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) or programmable read-only memory (PROM).

The control unit 170 is operably coupled to the vehicle controller 20, the battery B, the discharge control switch $SW_D$, the charge control switch $SW_C$, the temperature sensing circuit 140, the precharge switch $SW_P$ and the shunt resistor 160. The operable coupling between two components represents that the two components are connected to each other so that one component can transmit and/or receive a signal to/from another.

The control unit 170 performs the precharging operation for the smoothing capacitor C in response to the key-on signal from the vehicle controller 20. The control unit 170 may turn off the discharge control switch $SW_D$, the charge control switch $SW_C$ and the precharge switch $SW_P$ in response to the key-off signal from the vehicle controller 20.

The control unit 170 may determine i) a battery voltage value indicating a voltage across the battery B, ii) a capacitor voltage value indicating a voltage across the smoothing capacitor C $V_C$ (hereinafter referred to as a 'capacitor voltage') and iii) a thermistor voltage value indicating the thermistor voltage $V_T$ at a predetermined time interval using at least one Analog-Digital Convertor (ADC) embedded in the control unit 170.

During precharging, the control unit 170 turns off the discharge control switch $SW_D$, and turns on the precharge switch $SW_P$. Accordingly, during precharging, the precharge current flows through the battery B, the smoothing capacitor C, the precharge power line PC and the thermistor 142, and the capacitor voltage $V_C$ gradually rises.

During precharging, the control unit 170 may turn off the charge control switch $SW_C$, but the charge control switch $SW_C$ may be turned on. When the charge control switch $SW_C$ is turned off, the precharge current flows through the parasitic diode 121 of the charge control switch $SW_C$.

During precharging, the control unit 170 determines the precharge current value based on the shunt voltage value at the predetermined time interval.

While precharging is stopped, the control unit 170 may determine the temperature of the thermistor 142 based on the thermistor voltage $V_T$ at the predetermined time interval. The memory of the control unit 170 may store a voltage-temperature table defining a correlation between voltage and temperature of the thermistor 142. When the precharge current does not flow, the control unit 170 may obtain a temperature associated with the thermistor voltage $V_T$ from the voltage-temperature table as the temperature of the thermistor 142 at the predetermined time interval using the thermistor voltage $V_T$ as an index.

During precharging, the control unit 170 may determine the temperature of the thermistor 142 based on the resistance of the thermistor 142 at the predetermined time interval. The resistance of the thermistor 142 may be determined from the thermistor voltage $V_T$ and the precharge current according to the Ohm's law. The memory of the control unit 170 stores a resistance-temperature table defining a correlation between resistance and temperature of the thermistor 142. The control unit 170 may obtain a temperature associated with the resistance of the thermistor 142 from the resistance-temperature table as the temperature of the thermistor 142 at the predetermined time interval, using the resistance of the thermistor 142 as an index.

It is noted that during precharging, the temperature of the thermistor 142 rises by not only the temperature of the battery B but also the precharge current. Accordingly, during precharging, to accurately determine the temperature of the battery B, it is necessary to subtract an increase in temperature caused by the precharge current from a value determined as the temperature of the thermistor 142.

During precharging, the control unit 170 may determine the Joule heat of the thermistor 142 generated by the precharge current at the predetermined time interval. The Joule heat of the thermistor 142 generated for the predetermined time interval depends on the electrical energy supplied to the thermistor 142 through the precharge power line PC for the predetermined time interval. Accordingly, the control unit 170 may determine the Joule heat of the thermistor 142 using the following Equation 1.

$$\Delta Q_{pre}[k] = \Delta t \times I_{pre}[k]^2 \times R_{ntc}[k] \qquad \text{<Equation 1>}$$

In Equation 1, $\Delta t$ denotes the predetermined time interval, k denotes a cycle index that increases by 1 each time the predetermined time interval has passed since precharging started (for example, the time point at which the key-on signal is received), $\Delta Q_{pre}[k]$ denotes the Joule heat determined when the cycle index is k, $I_{pre}[k]$ denotes the precharge current value determined when the cycle index is k, and $R_{ntc}[k]$ denotes the resistance of the thermistor 142 determined when the cycle index is k. At the start of the precharging, k=0. $\Delta Q_{pre}[k]$ denotes the Joule heat of the thermistor 142 generated by $I_{pre}[k]$ during $\Delta t$ when $I_{pre}[k]$ is constantly maintained during $\Delta t$.

During precharging, the control unit 170 may determine a compensation temperature at the predetermined time interval. The compensation temperature indicates an increase in the temperature of the thermistor 142 by the precharge current. The control unit 170 may determine the compensation temperature using the following Equation 2.

$$\Delta T_{pre}[k] = \Delta T_{pre}[k-1] + \frac{\Delta Q_{pre}[k]}{TC_{ntc}} = \qquad \text{<Equation 2>}$$
$$\Delta T_{pre}[k-1] + \frac{\Delta t \times I_{pre}[k]^2 \times R_{ntc}[k]}{TC_{ntc}}$$

In Equation 2, $\Delta T_{pre}[k-1]$ denotes the compensation temperature determined when the cycle index is k−1, $\Delta T_{pre}[k]$ denotes the compensation temperature determined when the cycle index is k, and $TC_{ntc}$ denotes heat capacity of the thermistor 142. The remaining parameters of Equation 2 are equal to those of Equation 1. $\Delta T_{pre}[0]$ is 0° C. According to Equation 2, during precharging, the compensation temperature $\Delta T_{pre}[k]$ is periodically updated based on the Joule heat $\Delta Q_{pre}[k]$ accumulated at the predetermined time interval $\Delta t$. When k is the current time index, $\Delta T_{pre[k-1]}$ may be referred to as 'a previous compensation temperature', and $\Delta T_{pre}[k]$ may be referred to as 'a current compensation temperature'.

During precharging, the control unit 170 may determine, at the predetermined time interval, the temperature of the battery B by subtracting the compensation temperature from the temperature of the thermistor 142. For example, when the thermistor temperature=30° C. and the compensation temperature=2° C. at a specific time point during precharging, the temperature of the battery B at the specific time point may be determined as 28° C.

When the capacitor voltage value is equal to or higher than a threshold voltage value or the precharge current value is equal to or lower than a threshold current value, the control unit 170 may end the precharging operation. The threshold voltage value may be the result of multiplying the battery voltage value indicating the voltage of the battery B by a predetermined threshold ratio value (for example, 0.95) of less than 1.

Figure 2:
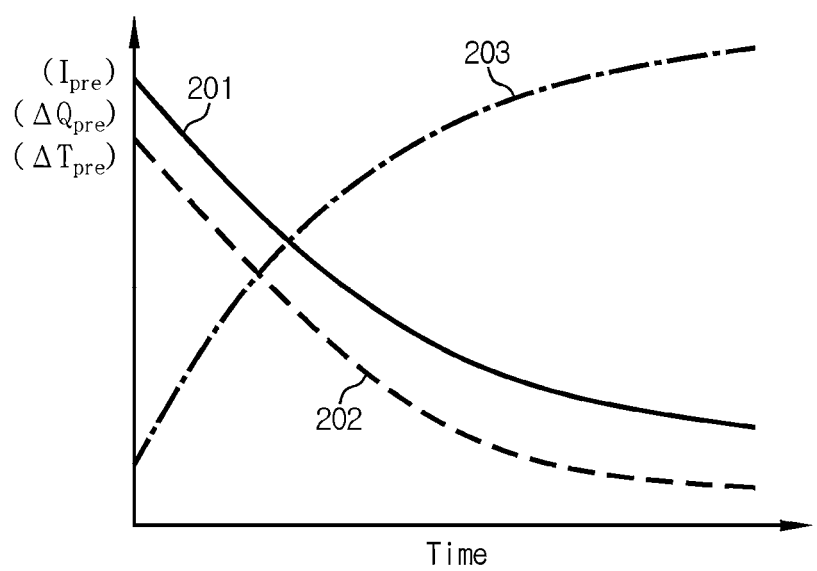
FIG. 2 is a graph exemplarily showing changes in precharge current, Joule heat of a thermistor and a compensation change while a precharging operation is performed by a battery management system shown in FIG. 1.

FIG. 2 is a graph exemplarily showing changes in the precharge current, the Joule heat of the thermistor 142 and the compensation change while the precharging operation is performed by the battery management system 100 shown in FIG. 1.

In FIG. 2, $I_{pre}$, $\Delta Q_{pre}$, $\Delta T_{pre}$ on the vertical axis indicate the precharge current, the Joule heat and the compensation temperature, respectively. A curve 201 indicates a change in the precharge current $I_{pre}$, a curve 202 indicates a change in the Joule heat of the thermistor 142, and a curve 203 indicates a change in the compensation temperature.

Referring to the curve 201, as the capacitor voltage $V_C$ gradually increases by precharging, the precharge current may gradually reduce.

Referring to the curve 202, the resistance of the thermistor 142 gradually reduces due to the Joule heat by the precharge current during precharging. When the precharge current and the resistance of the thermistor 142 gradually reduce, the Joule heat generated per the predetermined time may also gradually reduce.

Referring to the curve 203, as the Joule heat supplied by the precharge current is accumulated during precharging, the compensation temperature may gradually increase (see Equations 1 and 2).

Figure 3:
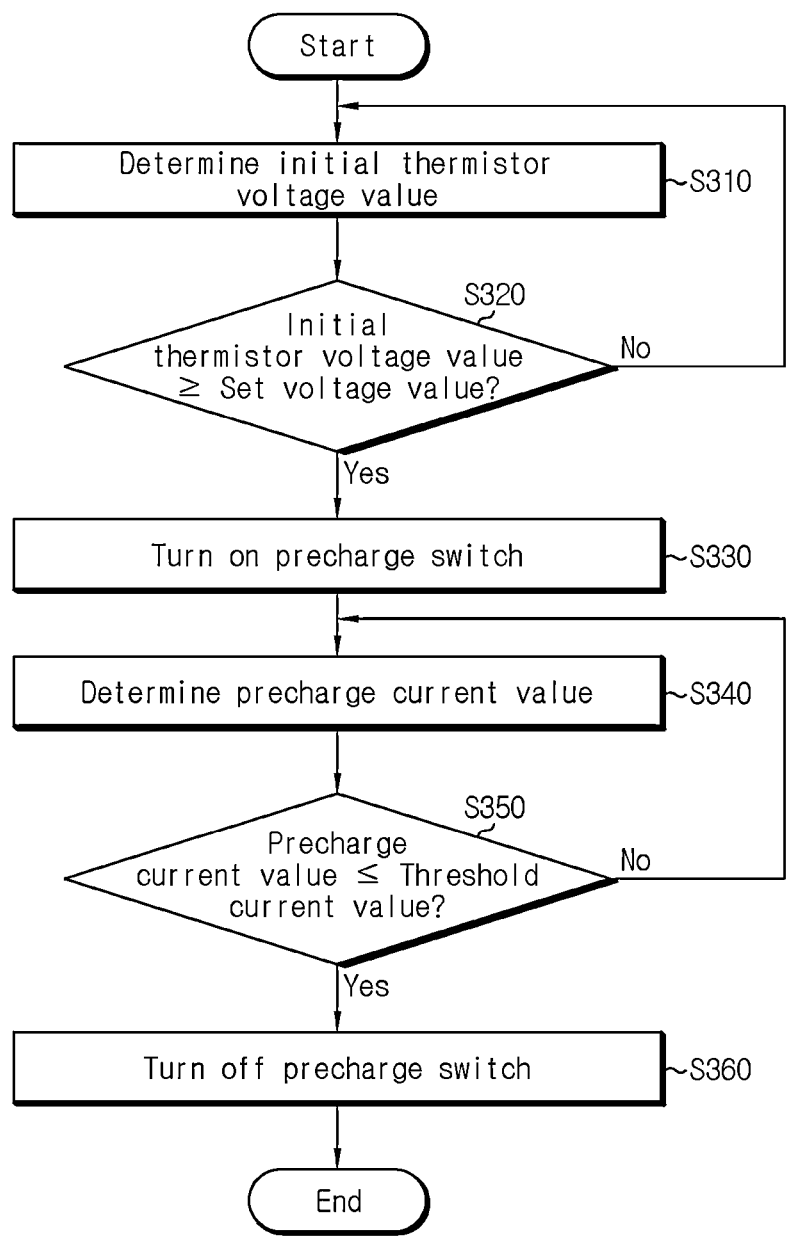
FIG. 3 is a flowchart exemplarily showing a battery management method according to a first embodiment of the present disclosure.

FIG. 3 is a flowchart exemplarily showing a battery management method according to a first embodiment of the present disclosure. The method of FIG. 3 is executed by the battery management system 100 of FIG. 1 in response to the key-on signal, and is for precharging of the smoothing capacitor C.

Referring to FIGS. 1 to 3, in step S310, the control unit 170 determines an initial thermistor voltage value. The initial thermistor voltage value indicates the thermistor voltage $V_T$ when the precharge current does not flow through the precharge power line PC (for example, the time point at which the key-on signal is received).

In step S320, the control unit 170 determines whether the initial thermistor voltage value is equal to or higher than a predetermined set voltage value. A value of the step S320 being "Yes" indicates that the resistance of the thermistor 142 is high enough to suppress inrush currents. The value of the step S320 being "No" indicates that the resistance of the thermistor 142 is not high enough to suppress inrush currents. When the value of the step S320 is "Yes", step S330 is performed. When the value of the step S320 is "No", the method of FIG. 3 may return to the step S310 or come to an end.

In step S330, the control unit 170 turns on the precharge switch $SW_P$ to allow the precharge current to flow through the precharge power line PC.

In step S340, the control unit 170 determines the precharge current value based on the shunt voltage value and the shunt resistance according to the Ohm's law.

In step S350, the control unit 170 determines whether the precharge current value is equal to or lower than the threshold current value. Alternatively, the control unit 170 may determine whether the capacitor voltage value is equal to or higher than the threshold voltage value. A value of the step S350 being "Yes" indicates that the precharge of the smoothing capacitor C is completed. When the value of the step S350 is "Yes", step S360 is performed. When the value of the step S350 is "No", the method may return to the step S340.

In step S360, the control unit 170 turns off the precharge switch $SW_P$.

During precharging, the control unit 170 may keep the discharge control switch $SW_D$ in the turn off state.

FIG. 4 is a flowchart exemplarily showing a battery management method according to a second embodiment of the present disclosure. The method of FIG. 4 is executable while the precharge current is flowing by the method of FIG. 3, and is for determining the temperature of the battery B from thermistor temperature during precharging.

Referring to FIGS. 1 to 4, in step S410, the control unit 170 determines the thermistor voltage value. The thermistor voltage value indicates the voltage $V_T$ across the thermistor 142 while the precharge current flows.

In step S420, the control unit 170 determines the resistance of the thermistor 142 based on the thermistor voltage value and the precharge current value (see the step S340) according to the Ohm's law.

In step S430, the control unit 170 determines the temperature of the thermistor 142 based on the resistance of the thermistor 142.

In step S440, the control unit 170 determines the compensation temperature (see Equations 1 and 2).

In step S450, the control unit 170 determines the temperature of the battery B by subtracting the compensation temperature from the temperature of the thermistor 142.

The control unit 170 may diagnose whether the temperature of the battery B resides in a predetermined normal temperature range using the method of FIG. 4 during precharging. When the temperature of the battery B is determined to reside outside of a predetermined normal temperature range during precharging, the control unit 170 may turn off all the discharge control switch 11, the charge control switch 120 and the precharge switch 130.

The embodiments of the present disclosure described hereinabove are not implemented only through the apparatus and method, and may be implemented through programs that realize the functions corresponding to the configurations of the embodiments of the present disclosure or recording media having the programs recorded thereon, and such implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that a variety of modifications and changes may be made within the technical aspect of the present disclosure and the equivalent scope of the appended claims.

Additionally, as many substitutions, modifications and changes may be made to the present disclosure by those skilled in the art without departing from the technical aspects of the present disclosure, the present disclosure is not limited by the foregoing embodiments and the accompanying drawings, and some or all of the embodiments may be selectively combined to make various modifications to the present disclosure.

What is claimed is:

1. A battery management system for a battery connected in parallel to a smoothing capacitor through a high side power line and a low side power line, the battery management system comprising:
 a discharge control switch between a first node and a second node of the low side power line;
 a temperature sensing circuit including a thermistor, a first terminal of the thermistor being connected to the first node;
 a precharge switch on a precharge power line connecting a second terminal of the thermistor to the second node; and
 a control unit coupled to the discharge control switch, the temperature sensing circuit, and the precharge switch, the control unit being configured to turn off the discharge control switch and turn on the precharge switch, for precharging of the smoothing capacitor, when the control unit receives a key-on signal.

2. The battery management system according to claim 1, wherein the control unit is configured to turn off the precharge switch when a voltage across the smoothing capacitor rises to equal to or above a threshold voltage.

3. The battery management system according to claim 1, wherein the control unit is further configured to:
 determine an initial thermistor voltage value in response to the key-on signal, the initial thermistor voltage value indicating a voltage across the thermistor when a precharge current does not flow through the precharge power line; and
 turn off the discharge control switch and turn on the precharge switch, for precharging of the smoothing capacitor, when the initial thermistor voltage value is equal to or higher than a predetermined set voltage value.

4. The battery management system according to claim 1, wherein the thermistor is a Negative Temperature Coefficient thermistor.

5. The battery management system according to claim 1, further comprising:
 a shunt resistor on the low side power line,
 wherein the control unit is further configured to determine a precharge current value indicating a precharge current flowing through the precharge power line, based on a shunt voltage value indicating a voltage across the shunt resistor at a predetermined time interval during the precharging of the smoothing capacitor.

6. The battery management system according to claim 5, wherein the control unit is further configured to:
 determine a resistance of the thermistor, based on a thermistor voltage value indicating a voltage across the thermistor and the precharge current value at the predetermined time interval during the precharging of the smoothing capacitor, and
 determine a temperature of the thermistor, based on the resistance of the thermistor.

7. The battery management system according to claim 6, wherein the control unit is further configured to determine a temperature of the battery by subtracting a compensation temperature corresponding to Joule heat of the thermistor by the precharge current from the temperature of the thermistor at the predetermined time interval during the precharging of the smoothing capacitor.

8. The battery management system according to claim 7, wherein the compensation temperature indicates an increase in the temperature of the thermistor caused by the precharge current.

9. The battery management system according to claim 7, wherein the control unit is further configured to determine the compensation temperature using the following Equation:

$$\Delta T_{pre}[k] = \Delta T_{pre}[k-1] + \frac{\Delta Q_{pre}[k]}{TC_{ntc}}, \quad \langle \text{Equation} \rangle$$

where:
 k is a cycle index that increases by 1 each time the predetermined time interval has passed since the precharging started,
 $\Delta T_{pre}[k-1]$ is the compensation temperature when the cycle index is k−1,
 $\Delta Q_{pre}[k]$ is the Joule heat of the thermistor generated for the predetermined time by the precharge current when the cycle index is k,
 $TC_{ntc}$ is a heat capacity of the thermistor, and
 $\Delta T_{pre}$ [k] is the compensation temperature when the cycle index is k.

10. The battery management system according to claim 1, further comprising:
 a diode connected to the precharge power line,
 wherein a current, from the second terminal of the thermistor to the second node, is blocked by the diode.

11. The battery management system according to claim 1, further comprising a charge control switch on the high side power line or the low side power line.

12. A battery pack, comprising:
 a battery connected in parallel to a smoothing capacitor through a high side power line and a low side power line; and
 a battery management system for the battery, the battery management system including:
  a discharge control switch between a first node and a second node of the low side power line;
  a temperature sensing circuit including a thermistor, a first terminal of the thermistor being connected to the first node;
  a precharge switch on a precharge power line connecting a second terminal of the thermistor to the second node; and
  a control unit coupled to the discharge control switch, the temperature sensing circuit, and the precharge switch, the control unit being configured to turn off the discharge control switch and turn on the precharge switch, for precharging of the smoothing capacitor, when the control unit receives a key-on signal.

13. The battery pack of claim 12, wherein the control unit is further configured to:
 determine an initial thermistor voltage value in response to the key-on signal, the initial thermistor voltage value indicating a voltage across the thermistor when a precharge current does not flow through the precharge power line; and turn off the discharge control switch and turn on the precharge switch, for precharging of the smoothing capacitor, when the initial thermistor voltage value is equal to or higher than a predetermined set voltage value.

14. The battery pack of claim 12, wherein:

The battery management system further includes a shunt resistor on the low side power line; and the control unit is further configured to determine a precharge current value indicating a precharge current flowing through the precharge power line, based on a shunt voltage value indicating a voltage across the shunt resistor at a predetermined time interval during the precharging of the smoothing capacitor.

15. The battery pack of claim 14, wherein the control unit is further configured to:

determine a resistance of the thermistor, based on a thermistor voltage value indicating a voltage across the thermistor and the precharge current value at the predetermined time interval during the precharging of the smoothing capacitor; and determine a temperature of the thermistor, based on the resistance of the thermistor.

16. The battery pack of claim 15, wherein the control unit is further configured to determine a temperature of the battery by subtracting a compensation temperature corresponding to Joule heat of the thermistor by the precharge current from the temperature of the thermistor at the predetermined time interval during the precharging of the smoothing capacitor.

17. An electric vehicle, comprising:

a battery pack including:

a battery connected in parallel to a smoothing capacitor through a high side power line and a low side power line; and a battery management system for the battery, wherein the battery management system includes:

a discharge control switch between a first node and a second node of the low side power line;

a temperature sensing circuit including a thermistor, a first terminal of the thermistor being connected to the first node;

a precharge switch on a precharge power line connecting a second terminal of the thermistor to the second node; and a control unit coupled to the discharge control switch, the temperature sensing circuit, and the precharge switch, the control unit being configured to turn off the discharge control switch and turn on the precharge switch, for precharging of the smoothing capacitor, when the control unit receives a key-on signal.

18. The electric vehicle of claim 17, wherein the control unit is further configured to:

determine an initial thermistor voltage value in response to the key-on signal, the initial thermistor voltage value indicating a voltage across the thermistor when a precharge current does not flow through the precharge power line; and turn off the discharge control switch and turn on the precharge switch, for precharging of the smoothing capacitor, when the initial thermistor voltage value is equal to or higher than a predetermined set voltage value.

19. The electric vehicle of claim 17, wherein:

The battery management system further includes a shunt resistor on the low side power line; and the control unit is further configured to determine a precharge current value indicating a precharge current flowing through the precharge power line, based on a shunt voltage value indicating a voltage across the shunt resistor at a predetermined time interval during the precharging of the smoothing capacitor.

20. The electric vehicle of claim 19, wherein the control unit is further configured to:

determine a resistance of the thermistor, based on a thermistor voltage value indicating a voltage across the thermistor and the precharge current value at the predetermined time interval during the precharging of the smoothing capacitor;

determine a temperature of the thermistor, based on the resistance of the thermistor; and determine a temperature of the battery by subtracting a compensation temperature corresponding to Joule heat of the thermistor by the precharge current from the temperature of the thermistor at the predetermined time interval during the precharging of the smoothing capacitor.

* * * * *